United States Patent [19]

Knapp et al.

[11] 3,912,122
[45] Oct. 14, 1975

[54] HIGH RELIABILITY PLANTER APPARATUS

[75] Inventors: Philip B. Knapp, Lynbrook; Jon R. Zogg, Baldwin, both of N.Y.

[73] Assignee: Minnesota Mining and Manufacturing Company, St. Paul, Minn.

[22] Filed: Sept. 26, 1973

[21] Appl. No.: 401,104

[52] U.S. Cl. .................. 221/162; 111/77; 221/185; 222/272; 222/281
[51] Int. Cl.² .......................................... A01C 7/04
[58] Field of Search ........... 221/162, 173, 182, 185; 111/77, 34, 83; 222/272, 281

[56] References Cited
UNITED STATES PATENTS

| | | | |
|---|---|---|---|
| 523,954 | 7/1894 | Baldwin | 222/272 |
| 778,440 | 12/1904 | Blue | 111/77 |
| 1,921,485 | 8/1933 | Seger | 221/162 |
| 2,378,896 | 6/1945 | Bryan | 222/281 |
| 2,603,383 | 7/1952 | Wilson | 222/281 |
| 3,636,897 | 1/1972 | Brink | 111/77 |

*Primary Examiner*—Robert B. Reeves
*Assistant Examiner*—Thomas E. Kocovsky
*Attorney, Agent, or Firm*—Alexander, Sell, Steldt & DeLaHunt

[57] ABSTRACT

The present invention is directed to a high reliability self-clearing planter apparatus intended particularly for use in connection with generally disc-shaped environmental seed cells which are formed of low density readily crumbled, compressed pulverulent material. The apparatus includes a carriage, and a chassis having a traction wheel, the wheel driving a conveyer apparatus for advancing a row of seed cells in edge to edge relation from a bulk supply hopper to a discharge station whereat the cells are released in precisely spaced relation for planting.

The conveyer includes a downwardly open slot defined between two counter-rotating cylindrical rollers, the spacing between the rollers being such as preclude a disc falling therebetween but sufficient to permit detritus and waste material to be dislodged and fall to the ground.

10 Claims, 11 Drawing Figures

HIGH RELIABILITY PLANTER APPARATUS

BACKGROUND OF THE INVENTION

1. Field of the Invention

The present invention is in the field of planting apparatus, and more particularly is directed to precision planting apparatus intended for use in planting so-called environmental seed cells, as exemplified by the cells of U.S. Pat. No. 3,690,034.

As set forth in said patent, it is possible, through the use of environmental seed cells, to make maximum efficient use of a given cultivated area by implanting such area with cells spaced in an optimum separated relation. In view of the extremely high germination rate of seeds suitably encapsulated in cells of the type described, it is possible to plant the cells initially in the spaced relation ultimately desired rather than to resort to the conventional practice of over-planting e.g., planting more seeds than may optimumly be grown in a given area and subsequently thinning the germinated seedlings to arrive at the desired plant concentration.

Environmental seed cells in accordance with the above patent and other cells heretofore proposed, have typically been fabricated by encapsulating a seed within a mass of compressed pulverulent material. Since it is desired that the seeds disintegrate rapidly on contact with ground moisture to expedite germination, it will be readily recognized that the protective material within which the seed is encapsulated normally incorporates high bulk, low density substance, suc as vermiculite, peat moss, etc. Such materials, when formed into discs or cells are extremely fragile and subject to crumbling. The crumbling tendency is accentuated by the fact that the cells must be assembled under relatively low compression since the application of high pressures may result in damage to the encompassed seed.

2. The Prior Art

Various planting apparatuses have been suggested for use with environmental seed cells. By way of example, attention is invited to U.S. Pat. Nos. 3,636,897 and 3,706,396 which disclose apparatuses intended to plant seeds at accurately spaced intervals without damaging the cells and at the same time deposit the cells in a selected orientation in the ground, normally with the circular face of the disc-like cells vertically disposed. The distance between said faces is hereafter referred to as the height of the cells. Due to the extremely fragile nature of the cells, there is a substantial tendency for the cells to be damaged by separating, orienting, conveying and depositing mechanisms which are interposed between the bulk receiver hopper and the deposit station. Similarly, the mere handling and shipping of the cells is often accompanied by a buildup of high bulk, low weight detritus flaked from the cells, which debris interfere with the accurate and efficient operation of the planter. Additionaly, the cells, due to their low density, do not flow freely, causing still further difficulties in the orientation and feed thereof.

SUMMARY

The present invention may be summarized as directed to an improved high accuracy planter for depositing fragile items, as exemplified by environmental seed cells, in a precise desired spaced relation and orientation, with minimal likelihood of damage to the cells in the course of feeding.

The planter is characterized by conveyer means whereby the low density seed cells from a bulk supply are led from a hopper to a discharge station for release to the ground, the conveyor functioning to orient the cells in a desired relationship and provide a continuous supply of oriented cells and also to clean or purge the cells and conveyer passages of detritus or the like which might otherwise accumulate and inhibit the desired continuous operation of the planter.

Still more particularly, the invention is directed to a planter including a carriage on which is tiltably mounted a chassis adapted to be connected to the draw or tool bar of a tractor, the device including a traction wheel engaging the ground. The traction wheel drives a pair of counter-rotating rollers in side by side relation, spaced apart to define therebetween a downwardly opening slot.

The rollers are inclined, the uppermost inclined end of the rollers being positioned beneath and forming the floor of a bulk supply hopper, from which hopper individual elements or discs may flow into the nip or space between the rollers, the transverse extent of such space being slightly less than the height of the discs, whereby the discs may not fall through the slot. The rollers are counter-rotated by a power takeoff derived from the traction wheel, the opposed roller faces preferably moving in an upward direction.

The lowermost inclined end of the rollers defines a discharge station, the rollers being preferably providied with recess portions so spaced on the roller periphery as to be shifted into registry once during each rotation of the rollers. The recesses preferably form a lowermost continuation of the open slot, the transverse extent of the slot, when the recesses are aligned, providing sufficient clearance for the passage therethrough and consequent release to the ground of an environmental seed cell, in the desired orientation.

The apparatus may include one or more brushes to aid in the even feed of the disc-like cells and the clearing of detritus, one brush preferably being located adjacent the discharge end and functioning in addition to the clearing effect heretofore mentioned, as a stop at the lower end of the slot to restrain, without likelihood of damage, the cells beyond the cell which is fed.

A secondary brush may be provided in proximate downstream relation to the hopper, for purposes of removing detritus from the surface of the rollers, as well as to assure the orderly feed of the cells.

The apparatus may be provided with sensing means at the discharge end, which provides the operator with an indication that seed cells are being periodically discharged in the intended manner.

Accordingly, it is an object of the invention to provide an improved planter apparatus especially adapted for feeding environmental seed cells.

A further object of the invention is the provision of a planter of the type described having means for clearing and preventing the accumulation of the flaked material and waste typically encountered in the use of seed cells of the type described, whereby a jam-free, continuous feed of the cells is assured.

A further object of the invention is the provision of a planter of the type described including a bulk supply hopper, a discharge station and a conveyor extending between the hopper and station, the conveyer supporting the seed cells on a surface which is continuously moving relative to the cells at a substantially greater speed than the speed of the cells themselves, the motion described, in combination with an open support slot over which the cells are advanced, assuring that the cells will be continuously advanced, notwithstanding their low density.

It is a further object of the invention to provide a conveyer planter of the type described which includes a conveyer wherein the seed cells are supported above an open slot of a dimension which prevents the cells from falling through, but permits waste materials, dirt, etc., to pass therethrough.

Still a further object of the invention is the provision of a device of the type described, including one or more brush means driven by power derived from a traction wheel, to facilitate the operation of the apparatus.

A further object of the invention is the provision of a planter of the type described, including a counter-rotating pair of side by side disposed cylindrical rollers, the rollers having their axes in parallel relation to each other, the uppermost inclined end of the rollers being positioned to receive environmental seed discs stored in the bulk hopper, the discs being conducted in a single row along the length of the rollers and in the nip therebetween, the spacing between the rollers being such as to provide an open slot of a size to prevent passage of the seed cells therethrough.

A further object of the invention is the provision of an apparatus of the type described wherein the lower end of the rollers defines a discharge station, the rollers being provided with recesses forming a continuation of the periphery of the rollers, the recesses being so sized and coordinated as to be shifted into registry with each other at least once during each rotation of the rollers, the transverse dimension of the registering recesses being sufficient to permit a seed cell to fall therethrough.

To attain these objects and such further objects as may appear herein or be hereinafter pointed out, reference is made to the accompanying drawings, forming a part hereof, in which:

Figure 1:
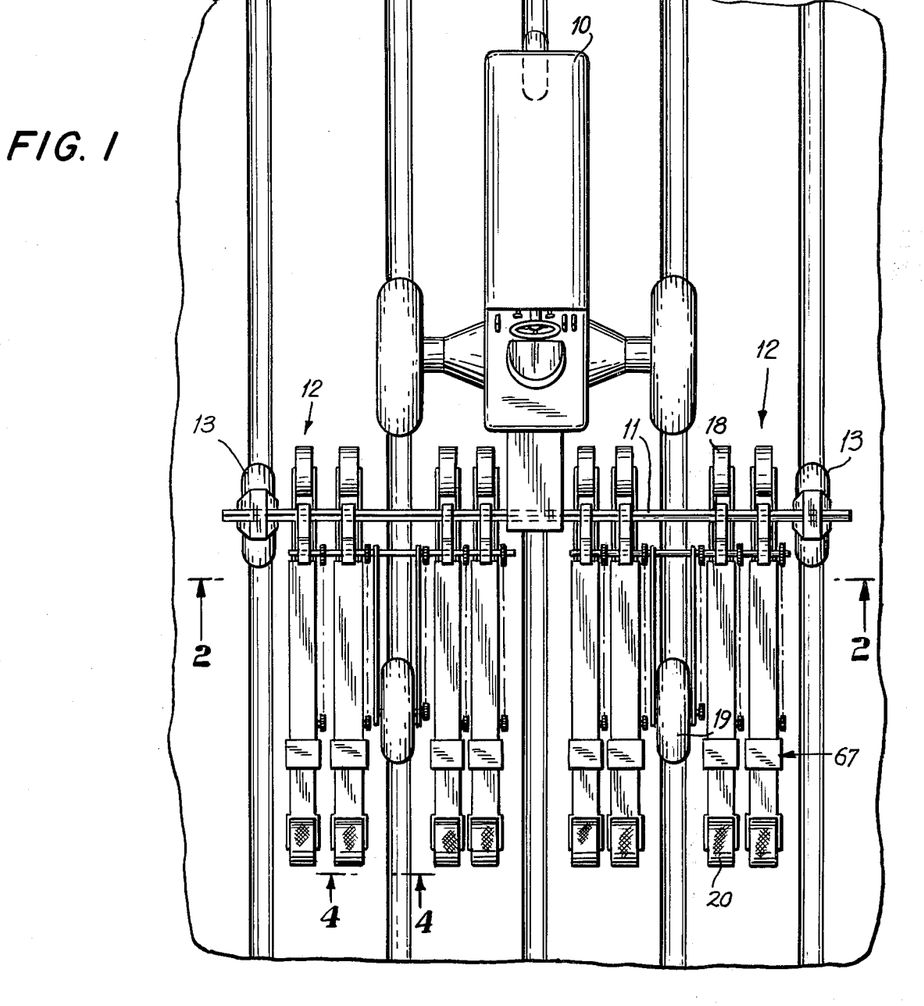
FIG. 1 is a top plan view of a tractor pulling a series of planter units in accordance with the invention.
Figure 2:
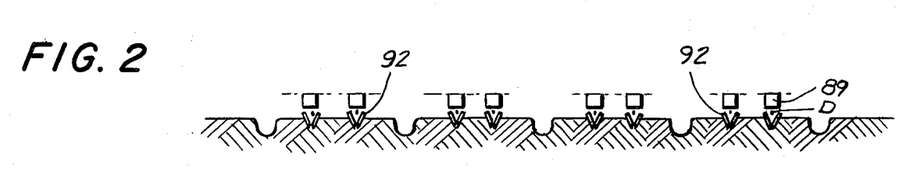
FIG. 2 is a cross-sectional view along the line 2—2 of FIG. 1.

Referring now to the drawings, there is shown in FIG. 1 a tractor 10 including a toolbar or draw bar 11 adapted to pull a series of planter units 12, the planter units 12 being the subject matter of the instant invention.

The toolbar 11 may include support wheels 13, the bar being connected to the planters 12 via vertical plates 14 affixed to carriage portion 15 of the planter. It will be appreciated that the carriage portion of the planter is formed of a series of interconnected, forwardly and rearwardly extending side struts 16, 17, a front support wheel 18 being rotatably mounted at the forward end of the carriage, a traction wheel 19 being rotatably mounted to the carriage at its side portion, and a furrow closer wheel 20 being rotatably mounted adjacent the rearmost portion of the struts 16, 17.

Motive power for operation of the planter apparatus is derived from traction wheel 19, the same being mounted on a yoke comprised of side struts 22, 23 pivotally carried on cross shaft 24 pivotally mounted on the vertical plates 14, the shaft 24 being similarly connected to and providing motive power for a series of adjacent planters 12. In view of the pivotal mounting of the struts 23, 22, the traction wheel which is affixed to axle 25 supported adjacent the ends 26, 27 of the struts 22, 23, respectively, will be in ground contact notwithstanding irregularities in the terrain.

A sprocket 28 is made fast to the axle 25, the sprocket driving chain 29, which is in turn in driving connection with sprocket 30 made fast to shaft 24. The rotating shaft 24 carries with it drive sprocket 31, connected by chain 32 to input sprocket 33 fixed to horizontally directed cross shaft 34, journalled in the parallel side plates 35, 36 of the chassis.

The chassis 21 is tiltable relative to the carriage 15 and to this end the carriage includes a pair of support plates 37, 38 in parallel spaced relation to the side struts 16, 17, respectively. The plates 37, 38 include a pair of opposed, vertically directed slots 39, 40, within which slots rest the shank portions of support bolts 41, 42 made fast to the side plates 35, 36, respectively, of the chassis assembly. It will thus be observed that the chassis is pivotal about the connection between the bolts 41, 42 and slots 39, 40.

Figures 3, 4:
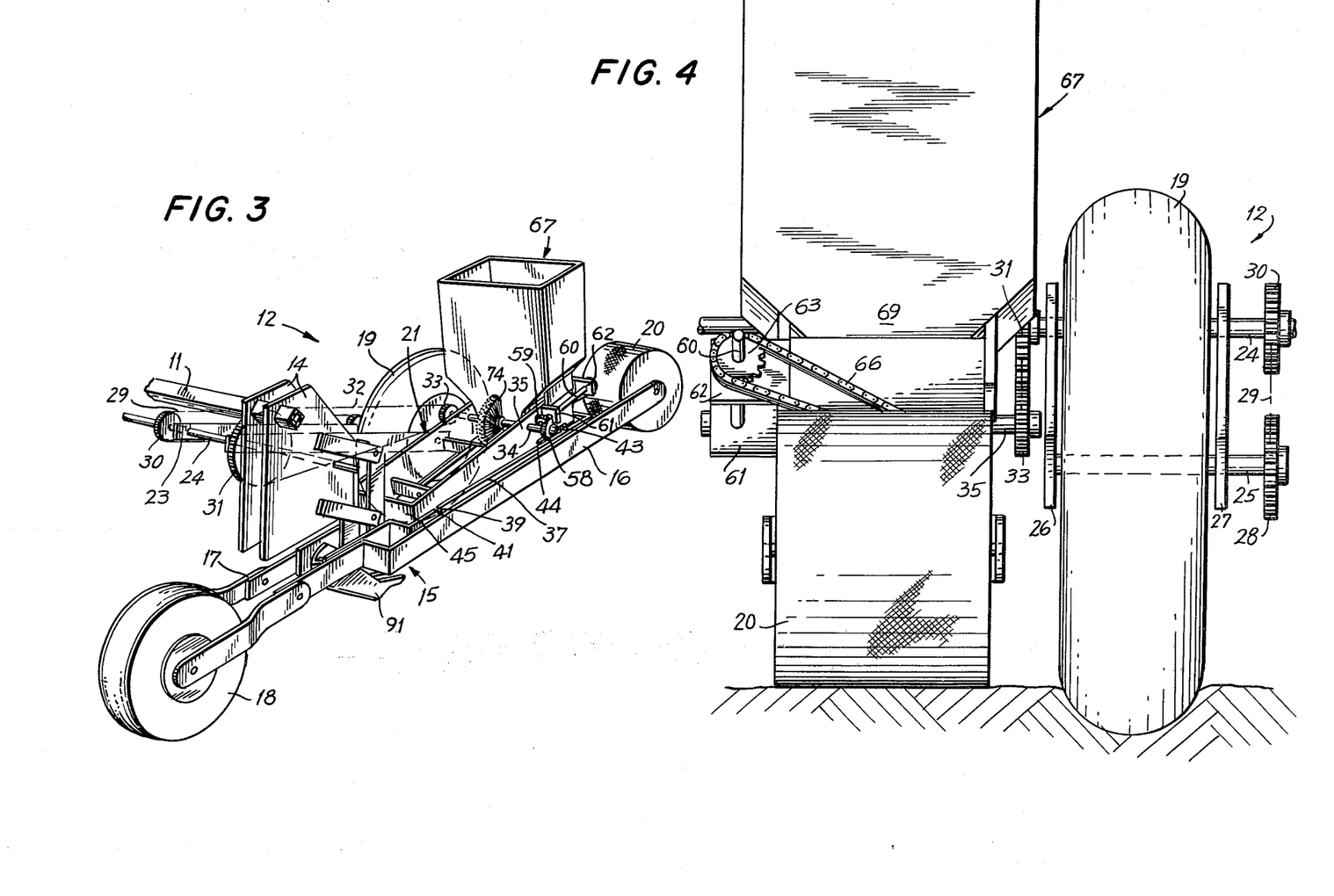
FIg. 3 is a perspective view of a planter unit.
FIG. 4 is a magnified rear view of a planter unit in accordance with the invention.

The rear end of the chassis includes an opposed pair of inclination adjustment bolts 43 (only one being shown in FIG. 3) which extend laterally outwardly beyond the plates 35 and 36. The adjustment bolts 43 are shiftable axially of the chassis within the longitudinally directed slots 44. From the above described arrangement it will be understood that forward and rearward adjustment of the bolts 43 within the slots 44 will vary the angularity or inclination which the chassis bears to the carriage. To facilitate cleaning, slots 44 may be upwardly open, permitting the entire chassis 21 to be lifted clear of the carriage after disconnection of chain 32, without the necessity of removing any bolts.

The chassis includes a front plate 45, generally vertically oriented and connected to the leading edges of the side plates 35, 36 and a rear plate 46 mounted between and connected to the rearmost ends of the plates 35, 36. A pair of longitudinally directed, spaced, parallel shafts 47, 48 are journalled in and rotatably mounted between the plates 45, 46. The spacing between the shafts 47, 48 may be varied, the same being disposed within horizontally directed slots 49, 50 in the forward plate 45 and extended horizontal slot 51 in the rear plate 46, suitable locking collars having rotating shaft supporting bearings formed therein being mounted in the slots to effect the desired lateral adjustment of the shafts while permitting rotation of the shafts relative to the plates.

Lateral adustment and locking may be effected by any means, such as, for example, by the adjustment nuts 52 extending through adjustment slot 53 of the plate 46 and made fast to the shaft mounting collars previously mentioned.

The shafts 47, 48 carry roller members 54, 55, next to be described.

Figure 10:
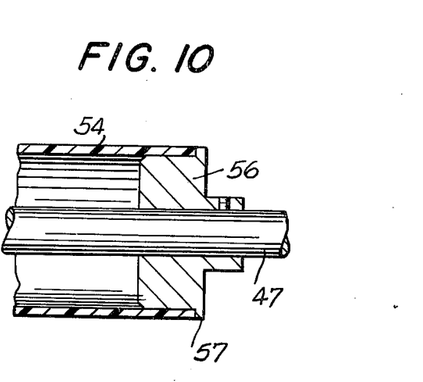
FIG. 10 is a fragmentary sectional view along the line 10—10 of FIG. 6.
Figure 11:
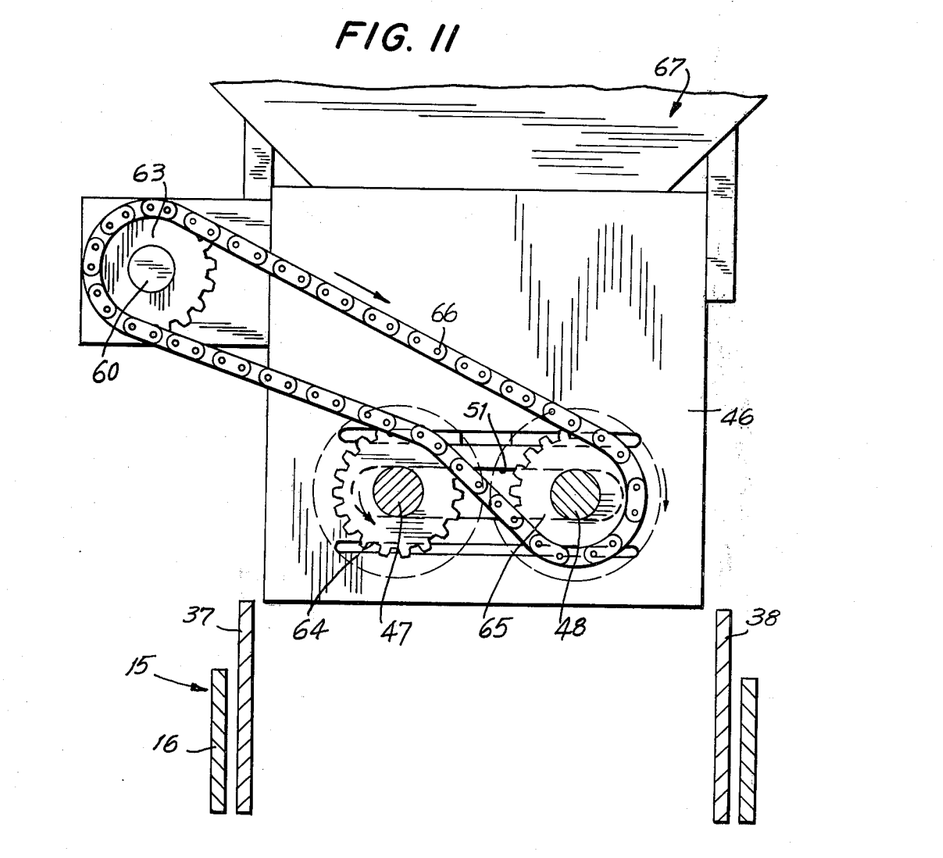
FIG. 11 is a sectional view along the line 11—11 of FIG. 6.

Referring particularly to FIG. 10 depicting shaft assembly 47, the rollers may comprise end collars 56 adjacent each end of each of the shafts 47, 48, the end collars preferably including stop shoulders 57. The roller members 54 are hollow cylindrical sleeves, the terminal ends of which abut the end stops 57 of the collars 56. Preferably, the sleeves or rollers 54 are comprised of aluminum or the like which may be covered with a smooth paint coating which may be readily cleaned and which provides low adhesion to detritus or other waste materials falling from the seed cells, coatings providing extremely high or low frictional characteristics being preferably avoided.

The shafts 47, 48 are counter-rotated by power take-off derived from the cross shaft 34 which is in turn, powered by the traction wheel 19. To this end, the cross shaft includes a bevel gear 58 in meshed relation with bevel gear 59 supported on longitudinally extending shaft 60 journalled between support brackets 61, 62.

The shaft 60 carries on its rearward terminal end a drive sprocket 63. The shafts 47, 48 have affixed thereto a pair of sprockets 64, 65 disposed in coplanar alignment with sprocket 63 of the shaft 60. A drive chain 66, meshed with the sprocket 63, is led over the sprocket 64 and around the sprocket 64, an arrangement which will be understood to drive the sprockets 64, 65 in opposite directions.

Figure 6:
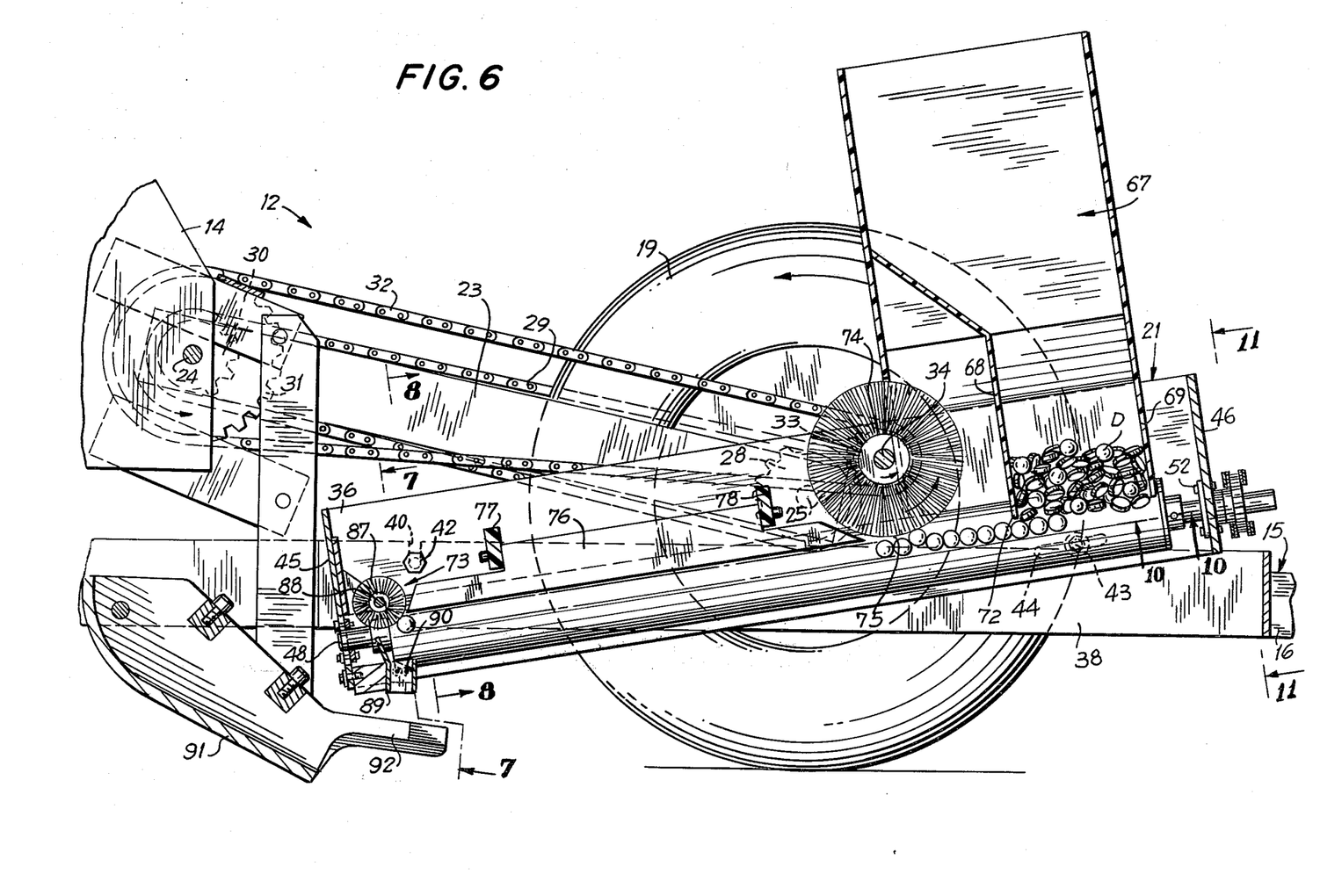
FIG. 6 is a vertical cross section along the line 6—6 of FIG. 5.

As best seen in FIG. 6, the orientation of the chassis relative to the carriage is such that the drive ends 47, 48 of the shaft are elevated as respects the ends of said shafts mounted to the front plate 45. The counter-rotating rollers 54, 55 form a conveyor and orienting mechanism for advancing a single file or row of seed cells from the rear toward the forward end of the planter.

The disc-like seed cells or pellets D are introduced into the slot S defined between the rollers at a position adjacent the upper end of the rollers. A hopper assembly 67 for holding a bulk supply of the discs D is secured by any suitable means over the rearmost ends of the rollers 54, 55.

Figure 8:
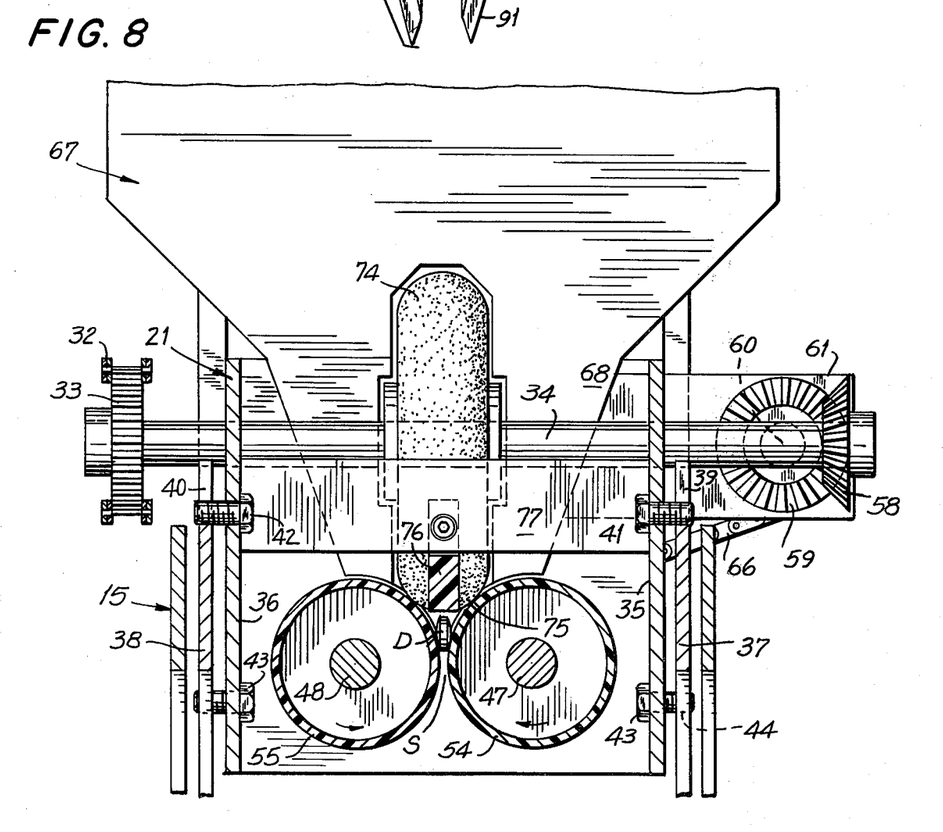
FIG. 8 is a section taken along the line 8—8 of FIG. 6.

The hopper includes adjacent its lowermost end forward and rearward depending skirt portions 68, 69, the lowermost ends of the skirts being shaped to conform to the periphery of the rollers, as best seen in FIG. 8. Side walls 70, 71 extend between the forward and rearward skirts 68, 69 respectively.

It will be appreciated that the floor of the hopper is defined by the counter-rotating rollers, which are in turn continuously rotated with their opposed surfaces defining slot S moving in an upward direction as the traction wheel is tracked across the ground surface. It will thus be observed that the discs or pellets D are continuously but gently agitated by the anti-friction surface of the rollers, such agitation causing at least a substantial proportion of the discs adjacent the surface of the rollers to assume a position tangent to the roller surface from which position the discs tend to fall into the desired vertical orientation centered between the rollers.

The lowermost portion 72 of the forward skirt 68 is spaced from the closest point of approach of the rollers 54, 55 a vertical distance sufficient to permit the passage of a properly (vertically) oriented disc disposed over the slot S beneath the portion 72, the horizontal dimension of the slot S defined between the roller surfaces being insufficient to permit the discs to fall therethrough. The discs will thus proceed in single file vertical array along the rollers and toward the discharge end 73. The movement of the discs in the noted direction is accomplished as a result of the inclination of the rollers, and facilitated by the fact that the constantly rotating anti-friction surfaces of the rollers result in a continuous agitation of the discs in the course of their travel.

The relative movement between the rollers and discs resulting from rotation of the rollers is an important factor in assuring their continued feed, as will be understood from consideration of the extremely low density of each of the discs or cells. A substantial advantage of the instant planter lies in the fact that, notwithstanding such low density, the rotation of the rollers assures a continuous supply of the discs, free from any substantial tendency toward jamming.

A further advantage of the conveyer assembly described, lies in the fact that dirt and crumbled material which might otherwise be likely to cause jamming of the discs is permitted, in the present apparatus, to fall clear through the slot S, whereby the conveyer is rendered continuously self-cleaning.

In order to augment the cleaning tendencies noted, and also in order to assist in the orientation of the discs, there is preferably provided an orienting and cleaning brush 74, mounted on shaft 34, the disc-shaped brush 74 being located vertically above the slot S defined between the counter-rotating rollers 54, 55, the lower peripheral portion 75 of the brush, as is best seen from FIGS. 6 and 8, being in wiping engagement with upwardly located portions of the counter-rotating rollers above the portions defining slot S. The spacing of the peripheral portion 75 from the uppermost surfaces of properly oriented discs descending between the rollers is sufficient to provide clearance between the brush and discs.

If a disc is not seated in the slot, but rather, is disposed at a level above the slot by reason of its being pinched between two adjacent discs, the brush, the lowermost portion 75 of which is moving in a direction counter to the direction of movement of the discs, will engage against the raised disc, urging it and a number of adjacent discs in a rearward direction, providing a space permitting the raised disc to descend to its proper orientation.

The brush periphery will also sweep any accumulation of materials from the faces of the rollers, effecting a constant cleaning action as well as an orienting or positioning action on the discs.

In order to maintain the discs D in the desired single file, non-stacked relation, there is provided a top or alignment plate 76, spaced vertically above the slot s the plate 76 being mounted between transverse brackets 77, 78, see FIG. 8.

Figure 5:
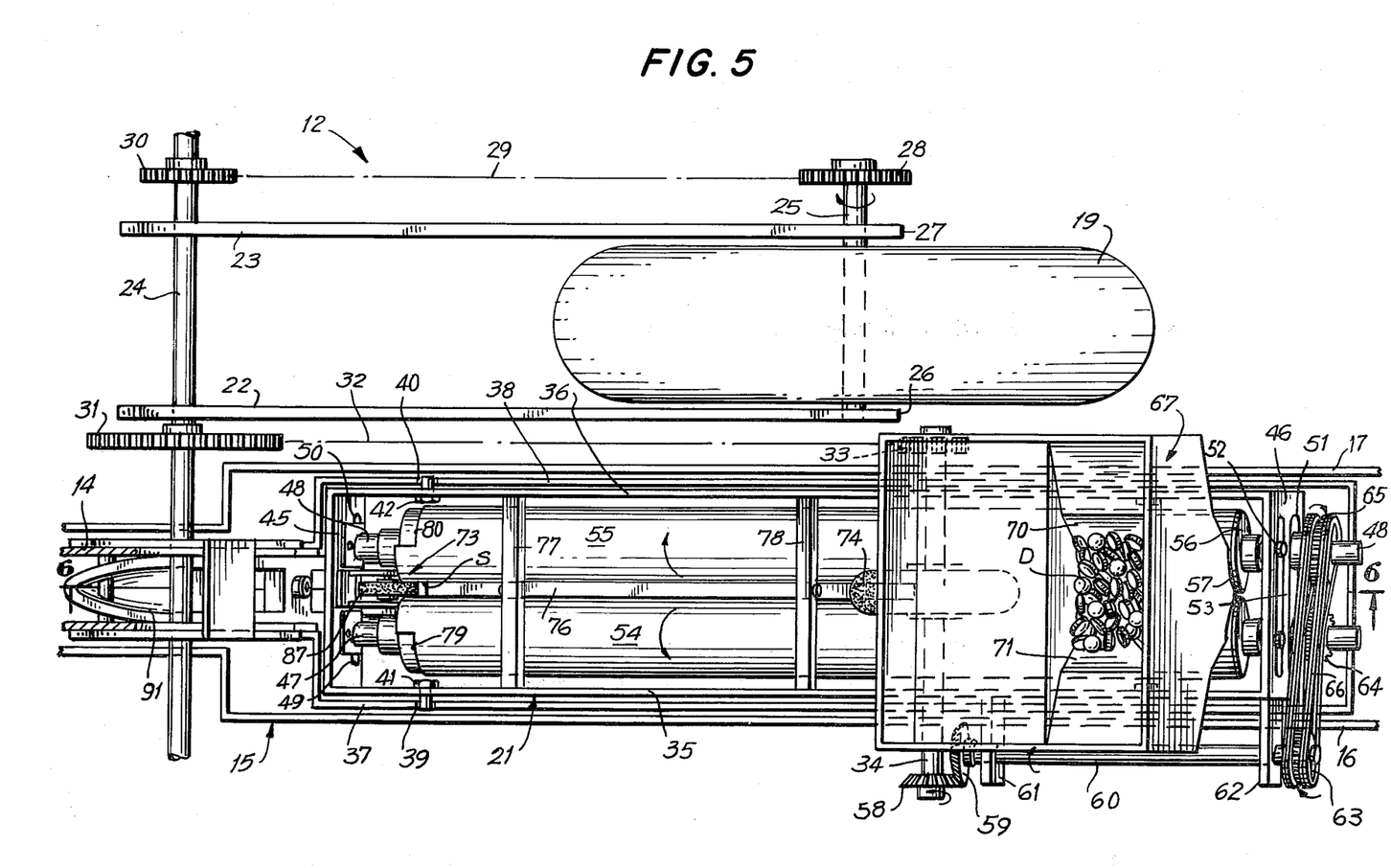
FIG. 5 is a top plan view of a planter unit.
Figure 7:
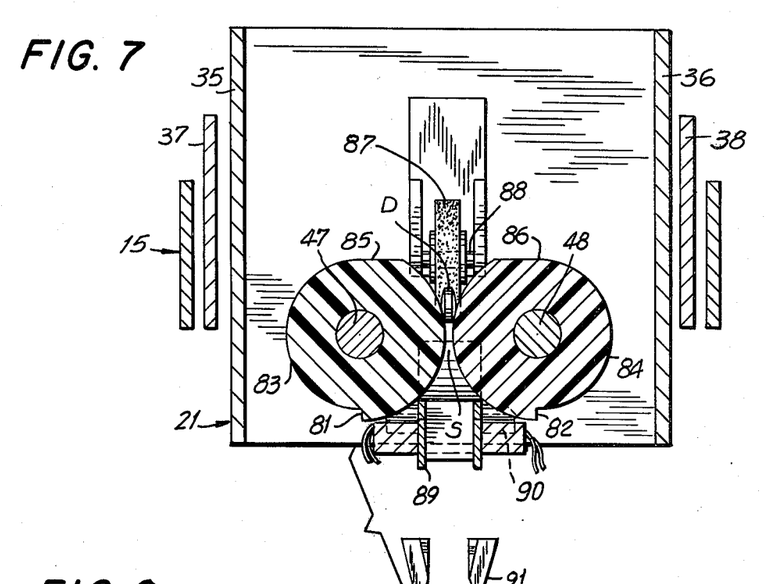
FIG. 7 is a vertical section taken along the discontinuous line 7—7 of FIG. 6.
Figure 9:
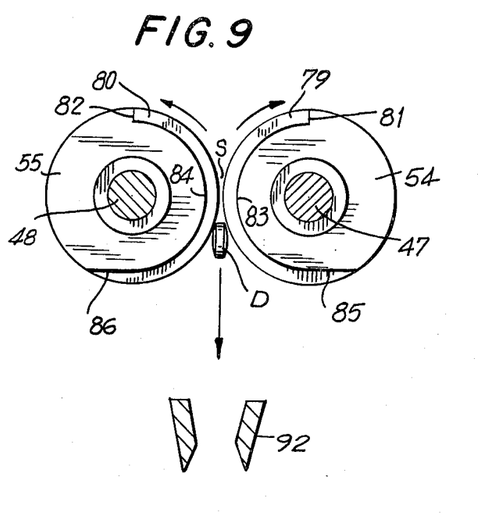
FIG. 9 is a schematic end elevational view of the discharge end of the conveyer rollers.

The discs D will continue in the nip or slot between the rollers until they reach the discharge station 73, from which position they are periodically released one at a time. The periodic discharge is effected as a result of recess portions in the periphery of the rollers becoming rotated simultaneously into registry, at which registering position, as will be understood, particularly from an inspection of FIGS. 5, 7 and 9, the spacing between the recess portions which form a continuation of the slot S, is sufficiently great to permit a disc to fall therethrough. To this end, the roller surfaces adjacent the discharge end are provided with peripheral, arcuate cutout portions 79, 80, running partially about the circumference of the rollers 54, 55. The cutout portions preferably include abrupt, radially extending introductory portions 81, 82, constant depth arcuate portions 83, 84 and angularly extending flat terminal portions 85, 86, blending gradually with the full diameter circumference portion of the rollers defining the slot S.

In order to assure that only a single disc D enters the discharge portions defined by the slots 79, 80, there is preferably positioned at the discharge station 73 an idler brush 87, rotatably mounted on a horizontally directed stub shaft 88, the periphery of the brush blocking the disc trailing the disc which has just been discharged from entering into the lower terminal portion of the slot until a successive rotation of the rollers returns the introductory portions 79, 80 of the recesses into alignment with each other. Preferably, the lower terminal portion of the brush 87 is positioned to graze or just clear the rollers. Optionally, the brush may be eliminated and a stop finger entering between the rollers may be substituted therefore.

The discs D passing between the rollers at the discharge station 73 fall to a chute 89, which preferably includes a photocell mechanism 90, for sensing the passage through the chute of a disc or seed cell. The control panel of the tractor will preferably be provided with a panel which incorporates a signal light for each planter apparatus. Under proper operating conditions, the photocell apparatus is connected to flash a light on the panel for each planter upon release of a seed cell. If the operator detects any significant period during which periodic flashing is not observed, he will recognize that either a hopper has been emptied or that, due to some malfunction, a continuous feed is not being accomplished.

In order to assure the proper planting of the discs D, the apparatus includes a furrow shoe 91 having a hollow interior portion, functioning in the usual manner to open a furrow in the ground of a selected variable depth. The shoe includes an open rearward end portion 92 below the chute 89 whereby the discs are permitted to fall in their desired orientation, e.g., with their circular sides disposed in a vertical plane, through the chute and into the earth. The furrow closer wheel 20 will tamp the formed furrow, closing the same over the planted discs.

As is well known, any suitable adjustment means may be provided to vary the angle of the furrow shoe relative to the remainder of the planter, to modify the furrow depth and hence the depth at which the seeds are planted.

From the foregoing it will be understood that there is provided an improved planter apparatus having special capabilities in respect to the feeding of lightweight, and hence difficultly controlled, items such as environmental seed cells.

The planter is adapted to deposit cells at precisely spaced positions in the ground, such predetermined spacing being independent of the speed at which the tractor is driven since the spacing is a function of the number of rotations of the rollers, which is in turn controlled by the engagement of the traction wheel and the ground surface.

The apparatus may be readily adjusted to accommodate seed cells of varying thicknesses by a simple spreading or contraction of the rollers and, if required, modification of the various clearances.

While the device has been described in connection with the planting of environmental seed cells, it should be evident that the same may be useful in the planting of certain relatively large seeds, e.g., peanut, corn, etc. which have been preselected to fall within controlled size range, it being understood that the claims are to be interpreted to encompass the noted use.

What is claimed is:

1. Planter apparatus for sowing discs of readily crushed material, such as environmental seed cells, at accurately spaced intervals, comprising, in combination, a chassis, wheel means rotatably mounted on said planter engaging the ground for rotation responsive to translatory movement of said planter along the ground, hopper means mounted on said chassis for receiving a bulk supply of said discs, a pair of elongated, cylindrical distributor rollers mounted on said chassis with their axes in parallel spaced relation, said rollers being disposed side by side, the spaced portions of the peripheries of said rollers defining therebetween an elongated vertically open slot, the transverse dimension of said slot being smaller than the height of said discs, said rollers having their axes inclined to the horizontal, the space above the upper inclined end of said rollers defining a receiver station and the lower end of said rollers defining a discharge station, exit means in said hopper means above said receiver station for depositing discs from said hopper means onto said rollers to form a row of discs in edge to edge alignment above said slot, said row being inclined in accordance with the inclination of said rollers, means powered by said wheel means for rotating said rollers to move the peripheral portion of one of said rollers defining said slot in an upward direction, through said slot, a generally cylindrical stop brush member mounted for rotation about a horizontal axis adjacent said discharge station, said brush being aligned with and forming a stop at the lower terminal end of said slot, the periphery of said brush being in wiping engagement with the lower end portions of said rollers, whereby said brush is rotated about said axis responsive to the rotary movement of said rollers, and release means at said discharge station operatively connected with at least one of said rollers for discharging the lead disc in said row in timed relation to the rotation of said rollers.

2. Planter apparatus for sowing discs of readily crushed material, such as environmental seed cells, at accurately spaced intervals, comprising, in combination, a chassis, wheel means rotatably mounted on said planter engaging the ground for rotation responsive to translatory movement of said planter along the ground, hopper means on said chassis for receiving a bulk supply of said discs, a pair of elongated cylindrical distributor rollers mounted on said chassis with their axes in parallel spaced relation, said rollers being disposed side by side, the spaced portions of the peripheries of said rollers defining therebetween an elongated vertically open slot, the transverse dimension of said slot being smaller than the height of said discs, said rollers having their axes inclined to the horizontal, the space above the upper inclined end of said rollers defining a receiver station and the lower end of said rollers defining a discharge station, exit means in said hopper means above said receiver station for depositing discs from said hopper means onto said rollers to form a row of discs in edge to edge alignment above said slot, said row being inclined in accordance with the inclination of said rollers, means powered by said wheel means for rotating said rollers, and release means at said discharge station operatively connected with at least one of said rollers for discharging the lead disc in said row in timed relation to the rotation of said rollers, such release means including a recess portion formed on the periphery of said at least one of said rollers, said recess portion being positioned to define an element of said slot once during each rotation of said one roller, the transverse dimension of said slot in registry with said recess portion being greater than the height of said discs.

3. The apparatus of claim 2 wherein each said roller includes a said recess portion, said rollers rotating in timed relation simultaneously to align said recess portions during each rotation of said rollers.

4. Apparatus in accordance with claim 2 and including a longitudinally extended cover portion in vertically spaced relation to said slot, the spacing between said cover portion and slot providing clearance for said row of discs but preventing vertical stacking of said discs.

5. Planter apparatus for sowing discs of readily crushed material, such as environmental seed cells, at accurately spaced intervals, comprising, in combination, a chassis, wheel means rotatably mounted on said planter engaging the ground for rotation responsive to translatory movement of said planter along the ground, hopper means on said chassis for receiving a bulk supply of said discs, a pair of elongated cylindrical distributor rollers mounted on said chassis with their axes in parallel spaced relation, said rollers being disposed side by side, the spaced portions of the peripheries of said rollers defining therebetween an elongated vertically open slot, the transverse dimension of said slot being smaller than the height of said discs, said rollers having their axes inclined to the horizontal, the space above the upper inclined end of said rollers defining a receiver station and the lower end of said rollers defining a discharge station, exit means in said hopper means above said receiver station for depositing discs from said hopper means onto said rollers to form a row of discs in edge to edge alignment above said slot, said row being inclined in accordance with the inclination of said rollers, means powered by said wheel means for rotating said rollers, release means at said discharge station operatively connected with at least one of said rollers for discharging the lead disc in said row in timed relation to the rotation of said rollers, and a disc-shaped wiper brush member interposed between said receiver and discharge stations, said wiper brush member being mounted for rotation about a horizontal axis perpendicular to the vertical plane extending from said slot and having its periphery extending into the space between said rollers, the nearest point of approach of a peripheral portion of said wiper brush member to said slot being spaced from said slot a distance to permit the passage beyond said wiper brush member of discs disposed in said slot and to block passage of discs disposed at a level above said slot, and drive means for rotating said wiper brush member to drive said peripheral portion in a direction opposite the direction of movement of said row of discs.

6. The apparatus in accordance with claim 5 wherein said spaced pair of rollers forms the floor portion of said hopper.

7. The apparatus of claim 5 wherein said drive means is activated by power derived from said wheel means.

8. The apparatus of claim 5 wherein peripheral portions of said wiper brush are in scanning contact with said rollers.

9. The apparatus of claim 5 wherein said chassis is mounted on a carriage forming a portion of said planter, the combination including means for pivoting said chassis relative to said planter about a horizontal pivot axis perpendicular to the axes of said rollers to thereby adjust the inclination of said rollers.

10. Planter apparatus for sowing discs of readily crushed material, such as environmental seed cells, at accurately spaced intervals, comprising, in combination, a chassis, wheel means rotatably mounted on said planter engaging the ground for rotation responsive to translatory movement of said planter along the ground, hopper means mounted on said chassis for receiving a bulk supply of said discs, a pair of elongated, cylindrical distributor rollers mounted on said chassis with their axes in parallel spaced relation, said rollers being disposed side by side, the spaced portions of the peripheries of said rollers defining therebetween an elongated vertically open slot, the transverse dimension of said slot being smaller than the height of said discs to restrict movement of said discs through said slot between said rollers, said rollers having their axes inclined to the horizontal, the space above the upper inclined end of said rollers defining a receiver station and a floor portion below said hopper means, the lower end of said rollers defining a discharge station, exit means in said hopper means above said receiver station for depositing discs from said hopper means onto said rollers to form a row of discs in edge to edge alignment above said slot and contacting said rollers, said row being inclined in accordance with the inclination of said rollers, means powered by said wheel means for rotating said rollers with the peripheral portion of at least one of said rollers defining said slot moving in an upward direction through said slot, a disc-shaped wiper brush member interposed between said receiver and discharge stations, said wiper brush member being mounted for rotation about a horizontal axis perpendicular to the vertical plane extending through said slot and having its periphery extending into the space between said rollers, the nearest point of approach of a peripheral portion of said wiper brush to said slot being spaced from said slot a distance to permit the passage beyond said wiper brush of discs disposed in said slot and to block passage of discs disposed at a level above said slot, drive means powered by said wheel means for rotating said wiper brush to drive said peripheral portion in a direction opposite the direction of movement of said row of discs, a longitudinally extended cover portion in vertically spaced relation to said slot and extending above said slot from said receiver station to said discharge station, the spacing between said cover portion and slot providing clearance for said row of discs but preventing vertical stacking of said discs, and release means at said discharge station operatively connected with at least one of said rollers for discharging the lead disc in said row in timed relation to the rotation of said rollers.

* * * * *